United States Patent
Kao

(10) Patent No.: US 6,622,254 B1
(45) Date of Patent: Sep. 16, 2003

(54) METHOD OF AUTOMATICALLY OVERCLOCKING CENTRAL PROCESSING UNITS

(75) Inventor: Jeffrey Kao, Taipei (TW)

(73) Assignee: Micro-Star International Co., Ltd., Taipei Hsien (TW)

(*) Notice: Subject to any disclaimer, the term of this patent is extended or adjusted under 35 U.S.C. 154(b) by 0 days.

(21) Appl. No.: 09/577,682

(22) Filed: May 22, 2000

(30) Foreign Application Priority Data

Mar. 17, 2000 (TW) ........................ 89104918 A

(51) Int. Cl.$^7$ .............................. G06F 1/04; G06F 1/08
(52) U.S. Cl. .................. 713/500; 713/501; 713/600; 713/601
(58) Field of Search ................. 713/500, 501, 713/600, 601

(56) References Cited

U.S. PATENT DOCUMENTS

| | | | | |
|---|---|---|---|---|
| 5,432,468 A | * | 7/1995 | Moriyama et al. | 327/152 |
| 5,710,910 A | * | 1/1998 | Kehl et al. | 713/400 |
| 5,862,368 A | * | 1/1999 | Miller et al. | 709/400 |
| 5,940,607 A | * | 8/1999 | Hwang | 713/501 |
| 6,047,373 A | * | 4/2000 | Hall et al. | 713/1 |
| 6,122,744 A | * | 9/2000 | Rashkovskiy et al. | 713/300 |
| 6,134,638 A | * | 10/2000 | Olarig et al. | 711/167 |
| 6,212,482 B1 | * | 4/2001 | Manning | 702/182 |
| 6,385,735 B1 | * | 5/2002 | Wilson et al. | 713/501 |
| 6,496,911 B1 | * | 12/2002 | Dixon et al. | 711/170 |

OTHER PUBLICATIONS

Kilchenmann, S. Re: Tsunami s1846s ... Overclockers On All Tyan Boards Take Note!!! [Online] alt.comp.periphs.mainboard.tyan, Dec. 17, 1999.*

* cited by examiner

*Primary Examiner*—Thomas Lee
*Assistant Examiner*—Michael Nieves

(57) ABSTRACT

The invention provides a method of automatically overclocking CPUs for a computer system by using a frequency generator with functions of tuning frequency and monitoring, and applying a numeric method to get the frequency for booting a computer system. When a computer system is powered on and enters the overclocking process, the built-in parameters storing booting settings are loaded and backed up to be referenced in the next trial of booting. The frequency of overclocking is calculated by a numeric method according to the highest frequency generated by the frequency generator and the frequency of front side bus of the system. The built-in parameters are then stored to boot up a computer system at next time. Once the configuration of the computer system is changed, the values of parameters are invalid and need to be recalculated by entering the overclocking process. Using this automatic method, overclocking can be done in a shorter time than overclocking manually.

3 Claims, 3 Drawing Sheets

METHOD OF AUTOMATICALLY OVERCLOCKING CENTRAL PROCESSING UNITS

FIELD OF THE INVENTION

The present invention relates generally to a method of overclocking central processing units (CPUs) for computer systems, and more particularly to a method of automatically overclocking CPUs by using a frequency generator with functions of tuning frequency and monitoring, and applying a numeric method to get the frequency for booting up computer systems.

BACKGROUND OF THE INVENTION

Overclocking refers to running a CPU at a higher clock speed than it is rated for. Pushing the CPU faster than it is marked and therefore getting more power for less money is definitely a rewarding feeling. There are three techniques of overclocking a CPU:

a. Changing the External Frequency

The external frequency is the speed at which the cache and the main memory communicate with the CPU. Changing the external frequency means to change the bus speed. Increasing the external frequency one step at a time is the most successful way to overclock a CPU.

b. Changing the Multiplier

The external frequency times the multiplier equals the CPU's internal frequency. Increasing the multiplier can overclock the CPU for the faster internal frequency. Consulting to the manual of motherboards about CPU to bus frequency ratio selection, the multiplier usually can be set by jumper on motherboards.

c. Changing the CPU Supply Voltage

There are two different types of voltages the CPU used. One is the I/O voltage noted as Vio, and the other is the core voltage noted as Vcore. Vio is the voltage used to transfer signals between the devices on motherboard. Generally, it has a constant value. Vcore is the voltage in which the CPU operates itself. It has a direct influence on the total frequency. Changing the Vcore from STD to VRE voltage is an important technique to overclock a CPU successfully for a bigger voltage difference between the digital high and low conditions, which results in more clear signals for the CPU and other devices on motherboard and achieving higher stability when operating.

Overclocking refers to increasing the speed of CPUs by changing their internal and external frequency. Thus, it is possible to operate a Pentium 120 CPU at 133 MHz, a Pentium 200 MHz at 250 MHz, or a Pentium PRO 200 MHz at 233 MHz, etc.

The quality of motherboards and CPUs plays an important role in overclocking successfully. Different brands of motherboards and CPUs make different overclocking experiences. However, it has to follow the major steps to overclock a CPU of a computer system:

1. Turn off the computer system, open it up, consult the motherboard manual, check the external frequency and multiplier jumper settings on the motherboard, and write them down.
2. Check the CPU markings on top and bottom of the CPU, write them down and put the CPU back.
3. Check the supply voltage jumper settings on the motherboard.
4. Change the jumper settings for external frequency and/or multiplier according to the manual.
5. Change jumper to higher supply voltage according to the manual.
6. Change BIOS setup settings to the right values, if necessary.
7. Check cooling of CPU, if necessary.
8. Try some other memory timings in the BIOS setup, if necessary.

It is time-consuming and complicated in the process of overclocking for a need of checking many settings on manuals and motherboards, recording these settings and adjusting jumpers manually. In the present invention, automatic process for overclocking CPUs is a matter of concern.

SUMMARY OF THE INVENTION

The primary object of the present invention is to provide a method of automatically overclocking CPUs by using a frequency generator with functions of tuning frequency and monitoring.

According to the invention, overclocking automatically is done by several trails of booting with different frequencies. These frequencies are calculated by a numeric method according to the highest frequency generated by frequency generators and the frequency of front side bus (FSB) of the system. Using this automatic method, overclocking CPUs can be done in a shorter time than overclocking manually. The built-in parameters are stored to boot up a computer system at next time. Once the configuration of the computer system is changed, the values of the built-in parameters are invalid and need to be recalculated by entering the overclocking process.

The foregoing and other objects, features, aspects and advantages of the present invention will become more apparent from a careful reading of the detailed description, with appropriate reference to the accompanying drawings.

DETAILED DESCRIPTION OF THE PREFERRED EMBODIMENTS

Figure 1:
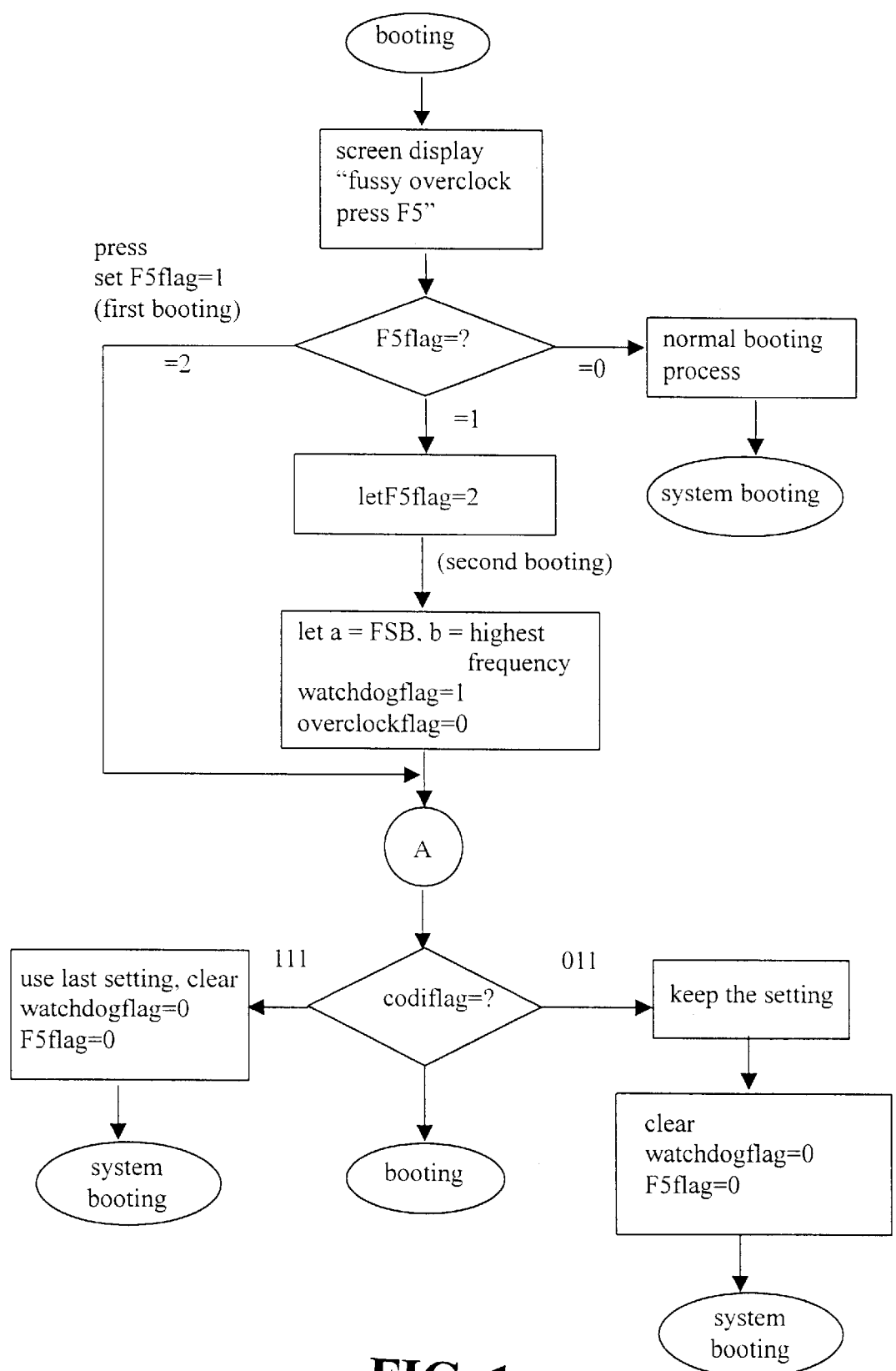
FIG. 1 illustrates the operating flow of overclocking process according to the invention.

The present invention uses a frequency generator with functions of tuning frequency and monitoring to automatically overclock a CPU for a computer system. Referring to FIG. 1, when a computer in powered on, a selection prompt of entering the overlocking process or normal booting process appears on the screen. The associated information about the overclocking process also shows on the screen. For example, the information may be "acknowledge a user that it needs to take some time to proceed an automatically overclocking procedure", or "acknowledge a user that he/she may exit from the computer system at time".

Some flags for recording current situation of the computer system are used in the present invention. They will be referenced in the overclocking process. The flags and their meanings are:

F5flag=0: not entering the overlocking process;
F5flag=1: entering the overlooking process for the first time;
F5flag=2: entering the overclocking process for the second time;
Overclock=0: overclock successfully;
Overclock=1: fail to overclock;
Watchlog=0: not monitor;
Watchlog=1: monitor;
Conditflag=0: boot at first trial;
Conditflag=3: overclock successfully at final trial;
Conditflag=7: overclock successfully at previous trial but fail at final trial.

Figure 2A:
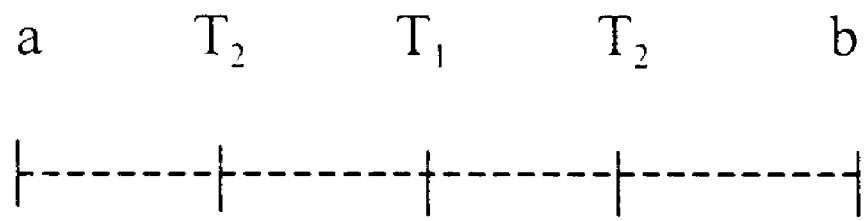
FIG. 2(a) illustrates the numeric method to get the frequency of booting computer system according to the invention.
Figure 2B:
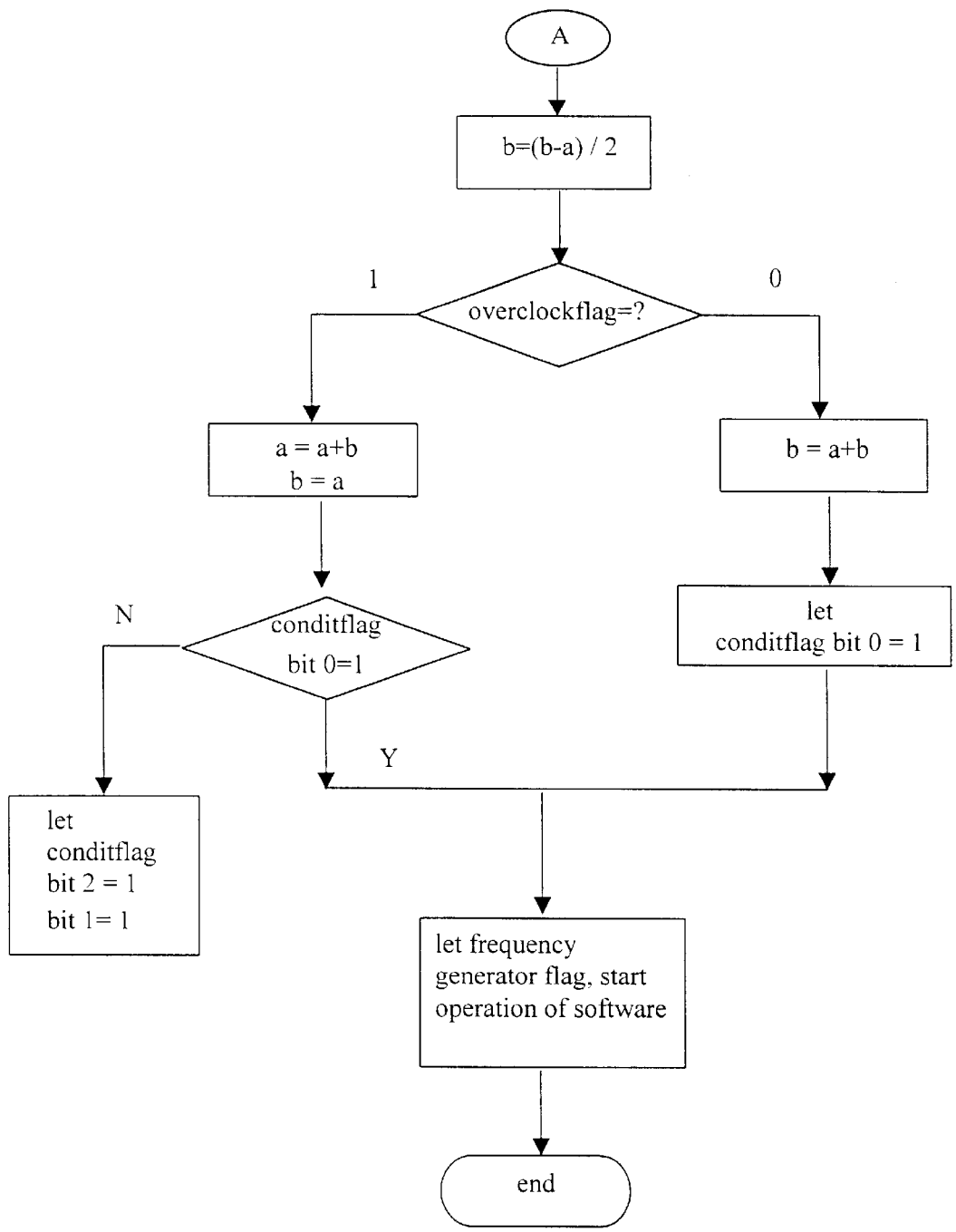
FIG. 2(b) illustrates how to calculate the booting frequency by using the numeric method, which is shown as part A in FIG. 1.

The numeric method to get the frequency of booting a computer system is depicted as FIG. 2(a). FIG. 2(b) illustrates how to calculate the booting frequency by using the numeric method, which is shown as part A in FIG. 1.

Referring to FIG. 2(a), the symbols and their meanings are:

a: the frequency of FSB;
b: the highest frequency generated by frequency generators;
$T_1$: the calculated booting frequency between a and b in the first trial;
$T_2$: the calculated booting frequency in the second trial.

Those flags and values of a and b illustrated above, are built-in parameters when booting up the computer system. As shown in FIG. 1, when F5 is pressed to enter the overclocking process, the built-in parameters are loaded and a copy is kept for reference in the next trial of booting. The following describes the numeric method shown in FIG. 2(a).

If the computer system can be booted up at frequency $T_1$ then $T_1$ is set as the a lowest frequency. The booting frequency $T_2$ for the next trial is then calculated between $T_1$ and b. If the computer system cannot be booted up at frequency $T_1$ then $T_1$ is set as the highest frequency. The booting frequency $T_2$ for the next trial is then calculated between $T_1$ and a. The method continues the process to calculate the frequencies $T_2, \ldots, T_n$ until the computer system can be booted up. Thus, the possible calculated frequencies and the corresponding steps using this numeric method are illustrated as followings.

(a) $T_1$ is able to boot in the first trial→$T_2$ (>$T_1$) is able to boot in the second trial→
$T_3$(>$T_2$) is able to boot in the third trial→$T_4$(>$T_3$) is not able to boot in the fourth trial. $T_3$ is then the booting frequency in the situation.
(b) $T_1$ is not able to boot in the first trial→$T_2$ (<$T_1$) is not able to boot in the second trial→$T_3$ (<$T_2$ ) is able to boot in the third trial. $T_3$ is then the booting frequency.

The overclocking frequency calculated by the numeric method of the invention may not be the fastest speed that the CPU is able to overclock. However, the consumed time is shortest and the frequency is sure to boot up the computer system. After having booted up the computer system, the built-in parameters used in the overclocking process are stored for the next booting. If the configuration of the computer system is changed, the values of parameters are invalid and need to be recalculated by entering the overclocking process as mentioned above.

Although this invention has been described with a certain degree of particularity, it should be understood that the present disclosure has been made by way of preferred embodiments only. And, that numerous changes in the detailed construction and combination as well as arrangement of parts may be restored to without departing from the spirit or scope of the invention as hereinafter set forth.

What is claimed is:

1. A method of automatically overclocking CPUs for a computer system, comprising the steps of:

showing a screen when said computer system is powered on, said screen having a selection prompt of entering overclocking process and warning messages appearing on said screen;

loading built-in parameters and storing a copy of said built-in parameters for reference in a next trial of booting up said computer system;

calculating first booting frequency $T_1$ between frequency a and frequency b for a first trial, said frequency a being the frequency of a front side bus and said frequency b being a highest frequency generated by frequency generators;

repeating a step of calculating an (n+1)th booting frequency $T_{n+1}$ between $T_n$ and b for an (n+1) trial until said computer cannot be booted in said (n+1) trial and setting frequency $T_n$ as an overclocking frequency if said computer system is booted up successfully at said frequency $T_1$, said n being started with 1 and incremented by 1 after each trial; and repeating a step of calculating an (n+1)th booting frequency $T_{n+1}$ between a and $T_n$ for an (n+1) trial until said computer is booted successfully at said (n+1) trial and setting frequency $T_{n+1}$ as an overclocking frequency if said computer system is not booted up successfully at said frequency $T_1$, said n being started with 1 and incremented by 1 after each trail.

2. The method of automatically overclocking CPUs for a computer system as claimed in claim 1, wherein said method uses a frequency generator with functions of tuning frequency and monitoring, and applies numeric methods to get the frequency of booting up said computer system.

3. The method of automatically overclocking CPUs for a computer system as claimed in claim 1, wherein the values of said built-in parameters are invalid and recalculated by entering an overclocking process once the configuration of said computer system is changed.

* * * * *